United States Patent
Kraus

(10) Patent No.: US 6,876,458 B2
(45) Date of Patent: Apr. 5, 2005

(54) METHOD AND DEVICE FOR DETERMINING THE ABSOLUTE COORDINATES OF AN OBJECT

(75) Inventor: Anton Kraus, Rösrath (DE)

(73) Assignee: Steinbichler Optotechnik GmbH, Neubeuern (DE)

( * ) Notice: Subject to any disclaimer, the term of this patent is extended or adjusted under 35 U.S.C. 154(b) by 0 days.

(21) Appl. No.: 10/478,121

(22) PCT Filed: Mar. 19, 2003

(86) PCT No.: PCT/EP03/02877

§ 371 (c)(1),
(2), (4) Date: Nov. 20, 2003

(87) PCT Pub. No.: WO03/078920

PCT Pub. Date: Sep. 25, 2003

(65) Prior Publication Data

US 2004/0150836 A1 Aug. 5, 2004

(30) Foreign Application Priority Data

Mar. 20, 2002 (DE) .......... 102 12 364

(51) Int. Cl.⁷ .............. G01B 11/24
(52) U.S. Cl. .......... 356/603; 356/602; 356/616
(58) Field of Search .......... 356/601–624, 356/203–206, 151, 154; 250/200, 559.01, 559.07; 382/203–206, 151, 154

(56) References Cited

U.S. PATENT DOCUMENTS

| | | | |
|---|---|---|---|
| 4,259,589 A * | 3/1981 | DiMatteo et al. | 250/558 |
| 4,335,962 A | 6/1982 | Di Matteo et al. | |
| 4,349,277 A | 9/1982 | Mundy et al. | |
| 4,402,608 A * | 9/1983 | DiMatteo et al. | 356/623 |
| 4,564,295 A | 1/1986 | Halioua | |
| 4,641,972 A | 2/1987 | Halioua et al. | |
| 4,802,759 A | 2/1989 | Matsumoto et al. | |
| 5,289,246 A * | 2/1994 | Menjo | 399/333 |
| 5,414,517 A * | 5/1995 | Furuhashi | 356/602 |
| 6,373,561 B2 * | 4/2002 | Riegel | 356/73 |
| 6,510,244 B2 * | 1/2003 | Proesmans et al. | 382/203 |
| 6,538,742 B1 * | 3/2003 | Ohsawa | 356/405 |

FOREIGN PATENT DOCUMENTS

| | | |
|---|---|---|
| DE | 3843396 | 7/1990 |
| DE | 3907430 | 3/1991 |
| DE | 4011406 | 3/1992 |
| DE | 196 37 682 | 3/1998 |
| EP | 0181553 | 5/1986 |
| EP | 0343366 | 11/1989 |
| EP | 0534284 | 3/1993 |
| JP | 357110908 A * | 7/1982 |
| WO | 93/03579 | 2/1993 |

* cited by examiner

Primary Examiner—Gregory J. Toatley, Jr.
Assistant Examiner—Sang H. Nguyen
(74) Attorney, Agent, or Firm—Dilworth & Barrese LLP

(57) ABSTRACT

In a method for determining the absolute coordinates of an object (1), the object (1) is exposed to light (3) through a projection grid (2). The light (4) reflected by the object 1 is registered by a sensor (5). The image picked up by the sensor is evaluated. In order to improve such a method, the projection grid (2) comprises a first grid with a first grid vector ($G_1$), and a second grid with a second grid vector ($G_2$) which differs from said first grid vector. The sensor (5) is arranged at a distance (b) from the projection grid (2) such that the projections ($b_x$, $b_y$), of the base vector (b) leading from the first and from the second grids to the sensor (5), onto the associated grid vectors ($G_1$, $G_2$) differ in size.

35 Claims, 3 Drawing Sheets

METHOD AND DEVICE FOR DETERMINING THE ABSOLUTE COORDINATES OF AN OBJECT

BACKGROUND OF THE INVENTION

The invention relates to a method for determining the absolute coordinates of an object, in which method the object is exposed to light through a projection grid, the light which is reflected by the object is registered by a sensor, and the image picked up by the sensor is evaluated. The invention also relates to a device for determining the absolute coordinates of an object, comprising projection optics for projecting a projection grid onto the object, and comprising sensor optics with a sensor for registering the light reflected by the object.

Such processes and devices with which the absolute coordinates of an object or the surface of an object can be determined are already known. Area sensors, in particular CCD sensors or CMOS sensors, are used for this purpose.

The three-dimensional geometry of the surface of an object can be determined by means of the moiré technique and by means of projected lines. Evaluation of the contour line images can be by means of a computer, for example in the so-called phase-shift method. In this arrangement, sequentially phase-shifted images, i.e. images picked up by the sensor, can be read to the computer by way of a video camera, in the so-called temporal phase-shift method. It is also possible to process the contour line images by way of Fourier evaluation. Evaluation can also be by other techniques in which only one contour line image, i.e. only one sensor image or only one video image, is necessary. Examples of this are provided in DE 39 07 430 B1 and in DE 38 43 396 B1.

However, the moiré technique only provides the relative form of the surface of the object. Generally speaking, this technique is not suitable for determining the absolute distance between the sensor, or the camera respectively, and the object from a contour line image. With the above mentioned techniques and methods it is thus not possible to determine the absolute coordinates of the surface of the object.

However, these absolute coordinates of an object are required to determine the absolute size of the object, or, in the case of stepped cross-sections, the depth of the object. Since a contour line image does not contain any information about the imaging scale, additional information beyond the contour line image is needed.

This additional information can be obtained by distance sensors or by changing the contour line distance or by moving the object or the camera. However, this involves the shifting of masses, which in turn requires a stable construction of the experimental setup and also requires a considerable amount of time. The mechanical expenditure is very substantial if some level of precision is to be achieved.

DE 40 11 406 A1 describes a method and a device for quantitative absolute measurement of the three-dimensional coordinates of a test object by means of the moiré technique. In this method, the displacement distance of a calibration body and/or of the test object is measured perpendicular to the plane of the grids (projection grid and reference grid). From EP 0 343 366 A, a further method is known in which the moiré technique is also applied.

From U.S. Pat. No. 4,802,759, a method for determining the coordinates of a point of the object is known, in which method light is projected through a projection grid and said projection grid is imaged onto the object. The pattern which results as an image of the projection grid on the object is imaged on an area-shaped, locally resolving sensor. The coordinates of the point of the object are determined by triangulation of the point, starting from the projection grid and from the sensor. However, in this method, only a single sensor image is recorded. Implementation of this method requires identification of a reference line.

A further device which uses a triangulation method is known from EP 0 181 553 A.

U.S. Pat. No. 4,564,295 discloses a method in which a grid is projected onto an object. The object is then imaged and a reference grid (moiré) is superimposed on it. For the purpose of evaluation, the reference grid is moved, or alternatively, the projection grid and the reference grid are moved synchronously, as a result of which stationary contour lines are generated on the object.

From U.S. Pat. No. 4,641,972, a method is known in which a sinusoidal grid is projected onto the object, and the object is observed at an angle. Evaluation takes place using the phase shift technique. There is no evaluation by way of triangulation.

U.S. Pat. No. 4,349,277 discloses a method in which coloured grids are projected onto the object at at least two wavelengths. Imaging is by way of a colour filter for wavelength selection onto two diode lines. Equidistant grids in various colours, which are displaced in relation to each other, are projected in parallel. Evaluation is via the ratio of intensities of the respective colours.

In several methods based on triangulation, the coded light projection is used in which the projected light of a grid strip is viewed as a plane in space. The light, which is reflected by the object and which reaches a particular sensor element, is viewed as a straight line. The object point viewed with the camera is calculated from an intersection of the straight line defined by the sensor element and the viewed light plane. Identification of the viewed light plane is achieved by way of coding using the so-called coded light projection. In this method, absolute coding of the projected plane can take place by a sequence of projected binary patterns. In addition, a phase shift can be carried out so as to enhance accuracy.

Absolute coding of the light planes can also be achieved via colour information of the projected grid. However, there is a trade-off in that this involves a dependence on the colour characteristics of the object. In a similar way, patterns are used which involve local coding, for example binary samples or colour samples. In this method, image elements which are adjacent in the sensor image are viewed, with identification of the projected light plane being achieved by way of neighbourhood observation.

U.S. Pat. No. 4,802,759 discloses a method for determining the coordinates of an object in which the object is exposed to light which is emitted through a projection grid, and with the light reflected by the object being registered by a sensor.

From U.S. Pat. No. 4,335,962, a method for determining the coordinates of an object is known in which the object is exposed to light which is emitted through a projection grid, and with the light reflected by the object being registered by a sensor. The absolute coordinates can be determined by means of a plane reference plate which is located at the margin of the imaging space.

DE 196 37 682 discloses a method for determining the spatial coordinates of objects in which three sensors can be used.

From EP 0 534 284 B1, a method for determining the absolute coordinates of an object according to the precharacterising part of claim 1 is known, in which method in a first position of the projection grid and of the sensor, a first image and evaluation are made, and in which subsequently the projection grid and/or the sensor is/are rotated by a certain angle and a second image and evaluation of the sensor are made. The absolute coordinates of the object can be determined from the evaluations.

SUMMARY OF THE INVENTION

It is the object of the invention to propose an improved method and an improved device for determining the absolute coordinates of an object.

According to the invention, this object is met in that the projection grid comprises a first grid with a first grid vector, and a second grid with a second grid vector which differs from said first grid vector, and in that the sensor is arranged at a distance from the projection grid such that the projections, of the base vector leading from the first and from the second grids to the sensor, onto the associated grid vectors differ in size.

The projection grid can be provided on a diapositive or a glass slide or a similar device, and it can be projected onto the object with one or several light sources by way of one or several lenses. However, it can also be generated by interference beating of coherent light irradiation, or in some other way.

In the case of 3D measurements involving strip projection, the sensitivity increases with an increase in the base length and thus an increase in the triangulation angle. In this context, the term "base" refers to the vector from the respective grid to the sensor. The triangulation angle is the angle between the line from the object point and the respective grid, and the line from the object point to the sensor. Sensitivity is determined by the projection of the base vector, i.e. the vector from the respective grid to the sensor, to the associated grid vector. As a result of the sensor being arranged in such a way, spaced apart from the projection grid, that the projection, of the base vector leading from the first grid to the sensor, onto the first grid vector, and the projection of the base vector, leading from the second grid vector to the sensor, onto the second grid vector differ in size, the respective sensitivities also differ. The sensitivities can be selected, by a respective selection of the base vector, such that the absolute coordinates of the object can be determined. In particular it is possible to select the base vectors from the grids to the sensor, and thus the sensitivities, such that only a single image needs to be taken by the sensor or by the camera in order to determine the absolute coordinates of the object. In this way it is possible, in the case of static unchanged grids, to determine the absolute coordinates of the object in a single image. There is no need for a coloured grid or a colour camera, so that the method according to the invention and the device according to the invention are independent of the colour of the object.

According to the invention, in particular a grid projection method can be carried out in which, with a single image by means of the direct phase-shift algorithm, two phase images with freely selectable sensitivities can be generated.

The invention is based on the recognition that only the projection of the base vector onto the grid vector affects the sensitivity which increases as the base length increases. By selecting the base vector accordingly, it becomes possible to achieve a situation in which the projection of the base vector which leads from the first grid to the sensor to the first grid vector is different from the projection of the base vector which leads from the second grid to the sensor to the second grid vector, so that, as a consequence of this, several sensitivities can be achieved. In particular, two freely selectable independent sensitivities can be achieved.

Advantageous improvements are described herein.

Preferably, the distance between the sensor and the grids is selected such that the object or a significant interesting area of the object or a discontinuity of the object is covered by a period of the grid which is evaluated at reduced sensitivity. Thus, the base vector for this grid is selected such that the object or a significant interesting area of the object or a discontinuity of the object is covered by a period of this grid. The arrangement can be selected such that even the largest possible object, i.e. the entire measuring volume of the device, or the largest possible significant interesting area of the object or the largest possible discontinuity is covered by a period of this grid. However, it is also possible in an adjustable device, to set the base vector such that said condition applies to the respective object or to its essential area or to its discontinuity.

This advantageous improvement ensures that unambiguous allocation or determination of the absolute coordinates becomes possible for each point of the object or of the measuring volume or of the essential region of the object or of the discontinuity of the object. This applies even if the surface of the object has cracks or shoulders or similar discontinuities.

The sensitivity of the other grid can be set to an adequate or to the best possible evaluation accuracy. Accordingly, a further preferred improvement is characterised in that the spacing between the sensor and the grids is selected such that evaluation of the grid evaluated at increased sensitivity takes place at adequate evaluation accuracy or at the best possible evaluation accuracy.

According to a further advantageous embodiment, the distance between the sensor and the grids is selected such that the object or a significant area of the object or a discontinuity of the object is covered by a first number of periods of the first grid and by a second number of periods of the second grid, which second number differs from said first number.

If the first number and the second number are relatively prime, a clear allocation of the phases and thus a clear definition of the absolute coordinates is obtained by way of the area selected. In one example, the first number is 7 and the second number is 9. The ratio of the grid periods is thus 7:9 which equates to a fractional-rational number.

The first number and the second number can be selected such that the selected area is covered by a period of the beat frequency of the periods of the grids. In an exemplary case this can be achieved in that the first number is 8 and the second number is 9, so that the ratio of the grid periods is 8:9.

According to a further advantageous improvement, the ratio of the first number to the second number corresponds to a transient number, i.e. a number which cannot be described by a fraction, and a number whose decimal representation does not recur, for example the exponential e or the circle ratio $\pi$. Transient numbers can only be approximated numerically. If the ratio of the first number to the second number corresponds to a transient number, in theory, the measuring volume is infinite. However, in practical application, this possibility is limited by measuring noise.

A further advantageous embodiment is characterised in that the distance between the sensor and the grids is selected such that a period of the grid evaluated at reduced sensitivity and/or of the grid evaluated at increased sensitivity covers four pixels on the sensor. In this case, a particularly simple evaluation algorithm results. However, other embodiments can also be applied to advantage.

It is advantageous if the grid vectors are aligned at right angles in relation to each other.

The grids can be formed by a cross grid. In this case, the first grid and the second grid are realised on a common projection grid. Preferably, the cross grid is rectangular, i.e. the grid vectors are aligned at right angles in relation to each other. Furthermore, it is advantageous if the grid vectors have the same value; this is advantageous in particular in the case of a projection grid with grid vectors which are aligned at right angles in relation to each other.

However, it is also possible for the grids to differ from each other. The grids which form the projection grid, i.e. the first grid and the second grid, can differ from each other, in particular the two grids can be spaced apart from each other differently.

A further advantageous improvement is characterised in that several sensors are provided. Preferably two sensors are used. By using several sensors, increased evaluation accuracy can be achieved. Preferably, the sensors are spaced apart from each other. Preferably, the different sensors comprise different base vectors. However, the base vectors can also be positioned on one line, in particular on one line which extends through the projection grid. According to a particularly advantageous improvement, the use of a cross grid and two sensors results in four different phase images being obtained, which phase images can be evaluated in a particularly advantageous way.

According to a further advantageous embodiment, several projection grids are provided.

The image made by the sensor can be evaluated by a phase shift. Either temporal and/or spatial phase shift can be applied.

Preferably a coloured projection grid is used. This is advantageous in particular if evaluation of the sensor image takes place by a phase shift.

According to a further advantageous embodiment, the projection grid is rotated.

It is advantageous if several images are made. In this way, evaluation accuracy can be enhanced.

BRIEF DESCRIPTION OF THE DRAWINGS

Below, one embodiment of the invention is explained in detail with reference to the enclosed drawings, as follows.

DESCRIPTION OF THE PREFERRED EMBODIMENTS

Figure 1:
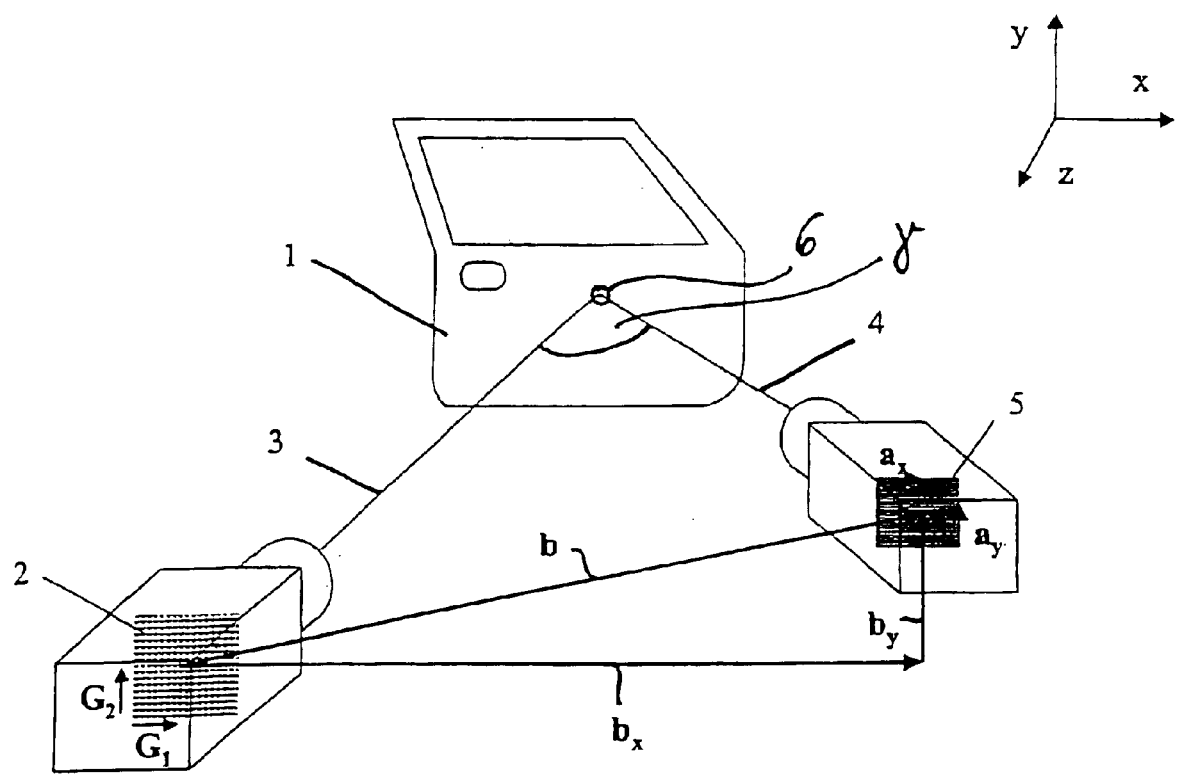
FIG. 1 a diagrammatic-perspective view of a device for determining the absolute coordinates of an object.

In the device shown in FIG. 1 an object 1 is exposed to light 3 through a projection grid 2. The light 4 which is reflected by the object 1 is imaged by a sensor 5, namely an area sensor, in particular a CCD sensor. The image of the sensor 5 is evaluated (not shown in the drawing).

Figure 3:
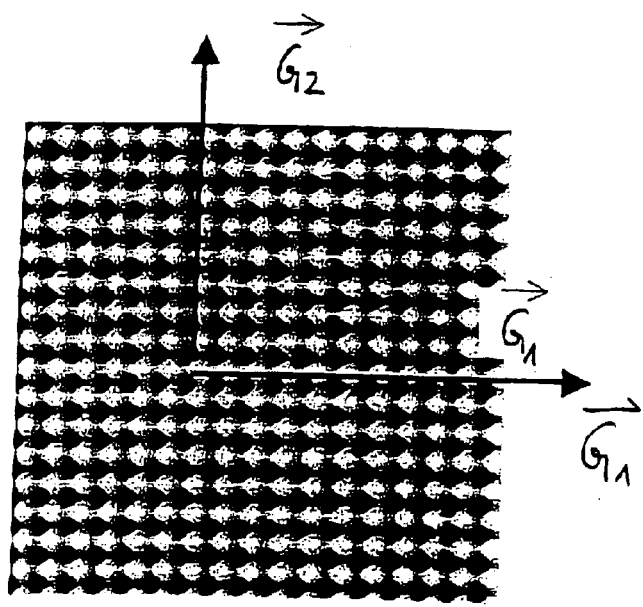
FIG. 3 a right-angled cross grid comprising two grid vectors.
Figure 4:
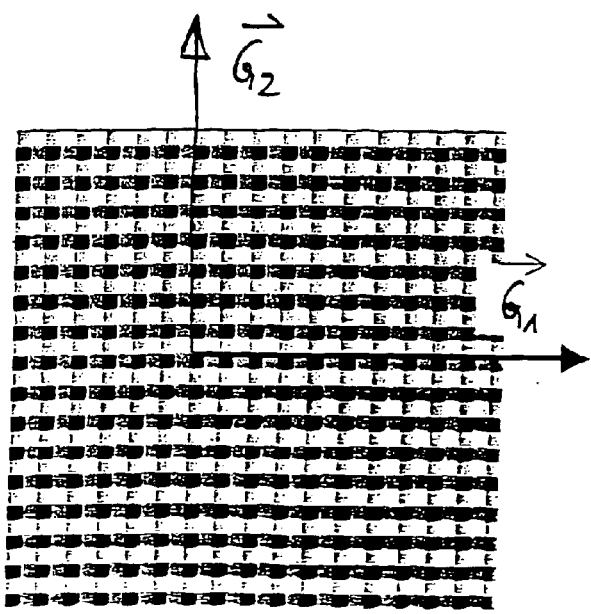
FIG. 4 a modification of a right-angled cross grid comprising two grid vectors.

One embodiment of the grid 2 is shown in FIG. 3, namely an ideal sine grid comprising two grid vectors G1 and G2 which are aligned at right angles in relation to each other. Instead, it would also be possible to use the right-angle cross grid shown in FIG. 4, a sine grid comprising two grid vectors $G_1$ and $G_2$, aligned at right angles in relation to each other, with a local coarse grid of the grey-scale value gradient. The amounts of the grid vectors $G_1$ and $G_2$ in FIGS. 3 and 4 are identical in each instance.

As shown in FIG. 1, the sensor 5 is arranged at a distance from the projection grid 2. The base vector which leads from the projection grid 2 to the sensor is designated b. The sensor 5 is arranged at a distance b from the projection grid 2 such that the projection $b_x$ of the base vector b onto the first grid vector $G_1$ is larger than the projection $b_y$ of the base vector b onto the second grid vector G2. On the sensor 5 the vector $a_x$ of the evaluation in the x-direction is parallel or almost parallel to the first grid vector $G_1$, while the vector $a_y$ of the evaluation in the y-direction is parallel or almost parallel to the second grid vector $G_2$. It must be ensured that the information of the grids can be adequately separated. The described selection of the base vector b ensures that the evaluation in the direction of the first grid vector $G_1$ or in x-direction takes place with greater sensitivity than does the evaluation in the direction of the second grid vector $G_2$ or in y-direction. The sensitivity increases with an increase in the length of the base, i.e. with increased length of the projection of the base vector b onto the respective grid vector, or with increased triangulation angle γ, wherein the triangulation angle γ is the angle between the line 3 from the object point 6 to the grid 2, and the line 4 from the object point 6 to the sensor 5.

The distance b of the sensor 5 from the grids of the projection grid 2 is selected such that the object 1 is covered by a period of the grid evaluated at reduced sensitivity, i.e. the grid with the grid vector $G_2$. Furthermore, this distance b is selected such that the evaluation of the grid selected at enhanced sensitivity, i.e. the grid with grid vector $G_1$, takes place at the best possible evaluation accuracy.

Figure 2:
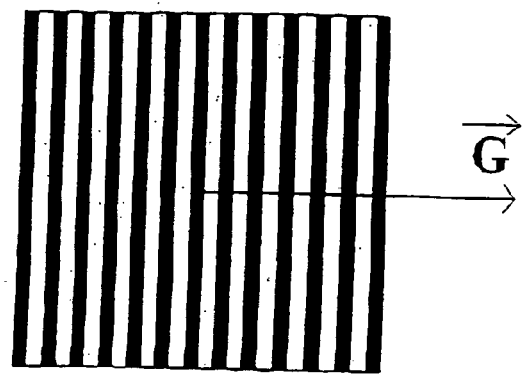
FIG. 2 a line grid comprising a grid vector.
Figure 5:
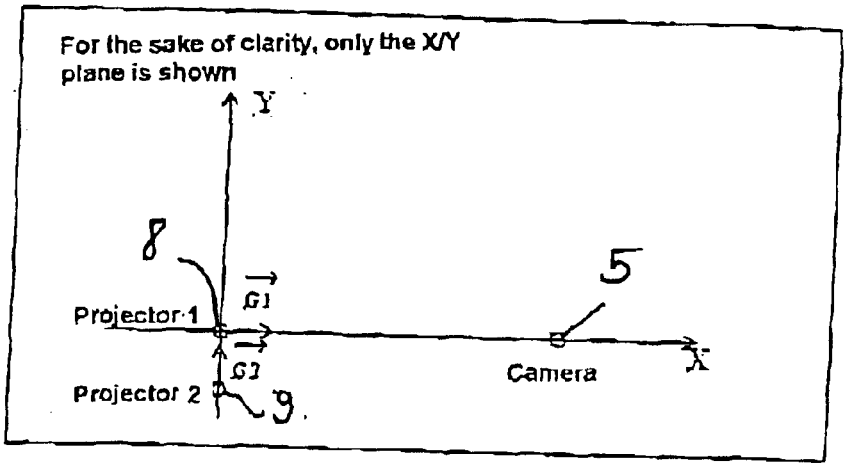
FIG. 5 a diagrammatic top view of a device for determining the absolute coordinates of an object comprising two projectors FIG. 6 a modification according to FIG. 5 comprising a projector and three cameras in a view which corresponds to that shown in FIG. 5.

Instead of a single projection grid which contains two grids, it is also possible to use grids which differ from each other, for example grids of the type shown in FIG. 2, which comprise only one grid vector G. These grids are arranged such that the grid vectors G differ from each other. They can be arranged at a distance from each other. Preferably the grid vectors G are aligned at right angles in relation to each other. FIG. 5 shows an example in which there is a first projector 8 with a grid comprising a first grid vector $G_1$, and a second projector 9 with a second grid vector $G_2$ which is aligned at right angles to the first grid vector, with said projectors being arranged so as to be spaced apart from each other. The connecting line between the first projector 8 and the second projector 9, which connection line is in the Y-axis, extends perpendicularly to the connection line between the first projector 8 and the sensor 5 of the camera; this line forms part of the X-axis.

Figure 6:
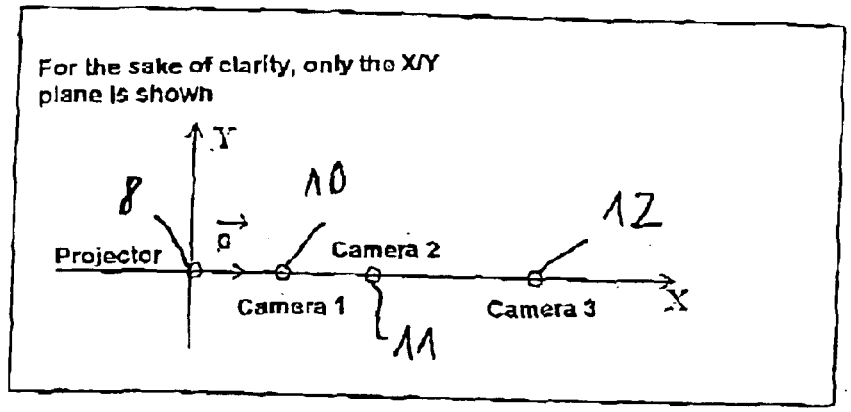

In the embodiment shown in FIG. 6 there is a projector 8 which is positioned in the origin of the X-Y coordinate plane. On the X-axis, a first camera 10, a second camera 11 and a third camera 12 are arranged so as to be spaced apart from each other.

Figure 7:
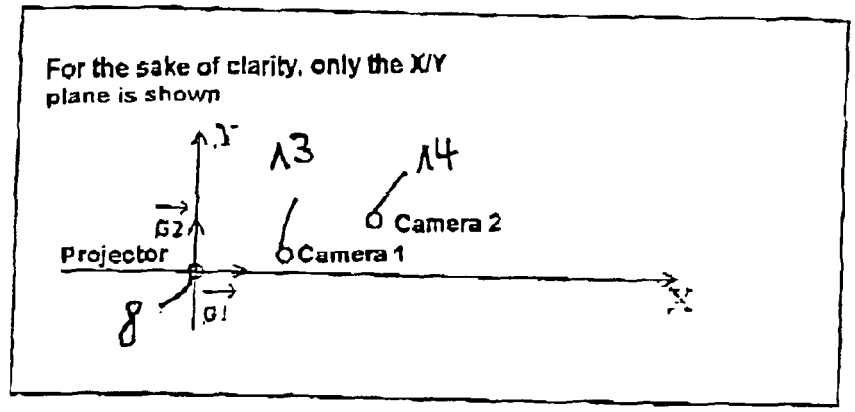
FIG. 7 a further modification of the devices according to FIGS. 5 and 6, comprising a projector and two cameras in a view which corresponds to that shown in FIGS. 5 and 6.

In the modified embodiment according to FIG. 7, a projector 8 is arranged in the origin of the X-Y coordinate system. The first camera 13 is positioned in the first quadrant of this coordinate system, namely closer to the X-axis than to the Y-axis. The second camera 14 is also positioned in the first quadrant of the X-Y plane, namely also closer to the X-axis than to the Y-axis. The projector 8, the first camera 13 and the second camera 14 are positioned approximately on one line, wherein the first camera 13 is positioned somewhat outside the connection line between the projector 8 and the second camera 14, namely somewhat closer to the X-axis.

The invention provides a method which makes it possible to measure absolute area coordinates of an object, with only a single image having to be taken. This becomes possible as a result of using a grid which is static and which at no time requires manipulation. Unlike the known "single-image" method, the method according to the invention requires neither a coloured grid nor a colour camera; it is thus independent of the colour of the object.

The transmission function of a grid, for example of the grid shown in FIG. 2, can be described as follows $$T(\vec{r}) = a + b * \sin(\vec{G} * \vec{r} + \Phi_n)$$

where:

$$\text{Grid vector } \vec{G} = \frac{2\pi}{g} \vec{r}_e$$

Grid constant $\vec{r}_e$ Unit vector in the direction of the grid vector $\Phi_n$ Phase of the grid r Vector to a position on the grid a Average value b Amplitude b/a Contrast

* Scalar product operator

The following applies: b>0 and a>=b and a+b<=1.

In 3D measuring with strip projection, the sensitivity increases as the base length and thus the triangulation angle γ increases, and as the grid constant decreases. However, only the projection of the base vector onto the grid vector has a bearing on the sensitivity. If, for example, the base vector is perpendicular to the grid vector, this results in a sensitivity of zero. Based on this, a grid projection method can be developed which, with a single image by means of an evaluation algorithm, such as for example the direct phase shift algorithm, generates two phase images of freely selectable sensitivities.

To this effect, a so-called cross grid with the following transmission function can be used:

$$T(\vec{r}) = a + b * \sin(\vec{G}_1 * \vec{r}) + c * \sin d(\vec{G}_2 * \vec{r})$$

wherein:

$G_1$=Grid vector of the first vector $G_2$=Grid vector of the second vector

T(r)=transmission function

The following applies: b>0 and c>0 and a>=b+c and a+b+c<=1. In the example selected, the grid vectors are perpendicular in relation to each other.

If the base b of the camera is selected $$\vec{b} = \lambda * \vec{G}_1 + k * \lambda * \vec{G}_2$$

with the control variable y, the sensitivity of the second grid with the grid vector $G_2$ (the amount of the second grid vector $G_2$ is equal to the amount of the first grid vector $G_1$) is greater by the factor k than the sensitivity of the first grid. Evaluation of the camera images, i.e. the images picked up by the sensors, by the evaluation algorithm, in particular the phase shift, for the two different grids takes place in the direction of the associated grid vectors $G_1$ and $G_2$.

In the example shown in FIG. 1, the projector with the projection grid 2 is in the coordinate origin. The two grid vectors $G_1$ and $G_2$ are on the X-axis and on the Y-axis respectively. In this coordinate system, the camera node, i.e. the sensor 5 of the camera, has the following local vector:

$$\vec{b} = \begin{pmatrix} b_x \\ b_y \\ 0 \end{pmatrix}$$

The edges of the sensor 5, i.e. of the CCD chip, are also aligned parallel to the X-axis and to the Y-axis. In the embodiment shown, the constants of the grids, the focal length of the projector, and the focal length of the camera are selected such that one grid period on the CCD sensor corresponds to four pixels in the X-direction and in the Y-direction.

If one evaluates the camera image by means of the evaluation algorithm, for example the direct phase shift algorithm, in the X-direction, then a sensitivity according to the X-component of the base vector is obtained, i.e. of the projection $b_x$ of the base vector b onto the grid vector $G_1$ of the first grid. An evaluation in the Y-direction with the evaluation algorithm, in particular the direct phase shift algorithm, returns a sensitivity according to the Y-component of the base vector b, i.e. of the projection $b_y$ of the base vector b onto the grid vector $G_2$ of the second grid. The two sensitivities behave like $b_x/b_y$. This applies if the pixels on the sensor 5 are square, or are arranged so as to be square, and if the amounts of the two grid vectors $G_1$ and $G_2$ are identical. If the pixels are not square, the frequency of the individual grids must be matched. The resulting sensitivity is then $(b_x * g_y)/(b_y * g_x)$ with the factors $g_y$ and $g_x$ required for matching the frequencies.

The same result is obtained if two projectors with one grid each are used, for example a line grid according to FIG. 2 for illuminating the object 1, wherein the grid vectors of the two projectors differ from each other and are preferably perpendicular in relation to each other, as is shown in an embodiment in FIG. 5. As above, the sensitivities then result from the projections of the base vector onto the respective grid vector. Evaluation is analogous to the evaluation described above.

A further option of obtaining several phase images with different sensitivities consists of using a projector with a grid vector and two or more cameras which have different base vectors, as is shown in an example in FIG. 6. In this example a projector 8 is used with a grid that has a grid vector G, for example a grid of the type shown in FIG. 2 (i.e. a line grid). Evaluation is by means of at least two cameras, in the example shown in FIG. 6 by three cameras with different base vectors, which are thus differently spaced apart from the projector 8.

Furthermore, it is possible to combine a projector with a cross grid with two cameras, as shown in FIG. 7. In this way, with a suitable selection of the positions of the cameras 13, 14, four different phase images are obtained.

If the spectral remission of the measured object is known, the direct phase shift can be replaced by a "colour phase shift". To this effect, three images of the phase shift are stored in the colour channels (for example RGB, corresponding to red, green and blue) of the grid, and imaged with a colour camera. In the coloured grid, for example the RGB grid, the phase difference between the individual coloured phase images is preferably 120°. From this, a phase image can be calculated after the spectral remission has been taken into account.

Evaluation of the sensor images can take place concurrently for the various grids, in particular within a video clock pulse or an imaging time of the sensor or of the CCD sensor.

The method according to the invention can be implemented with a projection grid which comprises two grid vectors which are preferably aligned so as to be perpendicular in relation to each other. However, it is also possible to use two projectors, each comprising a strip grid (with a grid vector), wherein the grid vectors of the strip grids are preferably aligned so as to be perpendicular in relation to each other. A further option consists of using a projector with a cross grid and of taking the image with several cameras. Better accuracy can be achieved in this way. The invention can also be implemented in that several projectors, each with a cross grid, are used, and in that evaluation takes place by means of a camera. It is advantageous if the projections of the several projectors differ from each other, for example in that they come into action in sequence, with evaluation being time controlled, or in that a different colour or a different polarisation of the light is used for each projector, so that in this way a differentiation of the various projections becomes possible during evaluation.

Evaluation can take place by a phase shift algorithm, for example by phase shifting via a coloured grid. In this case, a grid can be in each colour, wherein the grids preferably differ by 120° in relation to each other. It is also possible to carry out a temporal phase shift, wherein at least three separate images are taken with a time offset. In addition, the grid can also be rotated, and several images can be made at different rotations of the grid.

What is claimed is:

1. A method for determining the absolute coordinates of an object (1) in which the method the object (1) is exposed to light (3) through a projection grid (2);

the light (4) reflected by the object (1) is registered by a sensor (5); and the image picked up by the sensor (5) is evaluated, wherein the projection grid (2) comprises a first grid with a first grid vector ($G_1$), and a second grid with a second grid vector ($G_2$) which differs from said first grid vector, and the sensor (5) is arranged at a distance (b) from the projection grid (2) such that the projections ($b_x$, $b_y$), of the base vector (b) leading from the first and from the second grids to the sensor (5), onto the associated grid vectors ($G_1$, $G_2$) differ in size.

2. The method according to claim 1, wherein the distance (b) between the sensor (5) and the grids is selected such that the object (1) or a significant area of the object or a discontinuity of the object is covered by a period of the grid which is evaluated at reduced sensitivity.

3. The method according to claim 2, wherein the spacing (b) between the sensor (5) and the grids is selected such that evaluation of the grid evaluated at increased sensitivity takes place at adequate evaluation accuracy or at the best possible evaluation accuracy.

4. The method according to claim 2, wherein the distance (b) between the sensor (5) and the grids is selected such that the object (1) or a significant area of the object or a discontinuity of the object is covered by a first number of periods of the first grid and by a second number of periods of the second grid, which second number differs from the first number.

5. The method according to claim 1, wherein the spacing (b) between the sensor (5) and the grids is selected such that evaluation of the grid evaluated at increased sensitivity takes place at adequate evaluation accuracy or at the best possible evaluation accuracy.

6. The method according to claim 1, wherein the distance (b) between the sensor (5) and the grids is selected such that the object (1) or a significant area of the object or a discontinuity of the object is covered by a first number of periods of the first grid and by a second number of periods of the second grid, which second number differs from the first number.

7. A method according to claim 6, wherein the first number and the second number are relatively prime.

8. the method according to claim 6, wherein the ratio of the first number to the second number corresponds to a transient number.

9. The method according to claim 1, wherein the distance (b) between the sensor (5) and the grids is selected such that a period of the grid evaluated at reduced sensitivity and/or of the grid evaluated at increased sensitivity covers four pixels on the sensor (5).

10. The method according to any one of claim 1, wherein the grid vectors ($G_1$, $G_2$) are aligned at right angles in relation to each other.

11. The method according to claim 1, wherein the grids are formed by a cross grid.

12. The method according to claim 1, wherein the grids differ from each other.

13. The method according to claim 1, wherein several sensors (10, 11, 12, 13, 14) are provided.

14. The method according to claim 13, wherein two sensors are provided.

15. The method according to claim 1, wherein several projection grids (8, 9) are provided.

16. The method according to claim 1, wherein the image made by the sensor is evaluated by a phase shift.

17. The method according to claim 1, wherein a coloured projection grid is used.

18. The method according to claim 1, wherein the projection grid is rotated.

19. The method according to claim 1, wherein several images are made.

20. A device for determining the absolute coordinates of an object (1), comprising projection optics for a projection grid (2) onto the object (1) and sensor optics comprising a sensor (5) for registering the light reflected by the object (1), wherein the projection grid (2) comprises a first grid with a first grid vector ($G_1$), and a second grid with a second grid vector ($G_2$) which differs from said first grid vector, and the sensor (5) is arranged at a distance (b) from the projection grid (2) such that the projections ($b_x$, $b_y$), of the base vector (b) leading from the first and from the second grids to the sensor (5), onto the associated grid vectors ($G_1$, $G_2$) differ in size.

21. The device according to claim 20, wherein the distance (b) between the sensor (5) and the grids is selected such that the object (1) or a significant area of the object or a discontinuity of the object is covered by a period of the grid which is evaluated at reduced sensitivity.

22. The device according to claim 20, wherein the spacing (b) between the sensor (5) and the grids is selected such that the object (1) or a significant area of the object or a discontinuity of the object is covered by a period of the grid which is evaluated at reduced sensitivity.

23. The device according to claim 20, wherein the distance (b) between the sensor (5) and the grids is selected such that the object (1) or a significant area of the object or a discontinuity of the object is covered by a first number of periods of the first grid and by a second number of periods of the second grid, which second number differs from the first number.

24. The device according to claim 20, wherein the distance (b) between the sensor (5) and the grids is selected such that a period of the grid evaluated at reduced sensitivity and/or of the grid evaluated at increased sensitivity covers four pixels on the sensor (5).

25. The device according to claim 20, wherein the grid vectors ($G_1$, $G_2$) are aligned at right angles in relation to each other.

26. The device of claim 25, wherein the grids are formed by a cross grid.

27. The device according to claim 20, comprising several sensors (10, 11, 12; 13, 14).

28. The device according to claim 20, comprising several projection grids (8,9).

29. The device according to claim 20, comprising means for evaluating the image made by the sensor by phase shift.

30. The device according to claim 20, comprising a colored projection grid.

31. The device according to claim 20, comprising means for rotating the projection grid.

32. The device according to claim 20, structured and arranged such that the projection ($b_x$) of the base vector (b) onto the first grid vector ($G_1$) is larger than the projection ($b_y$) of the base vector (b) onto the second grid vector ($G_2$), on the sensor (5), a first vector ($a_x$) of evaluation is substantially parallel to the first grid vector ($G_1$) and a second vector ($a_y$) of evaluation is substantially parallel to the second grid vector ($G_2$), evaluation in the direction (x) of the first grid vector ($G_1$) takes place with greater sensitivity than in the direction (y) of the second grid vector ($G_2$), and sensitivity increases with increase in length of the base vector (b) or triangulation angle ($\gamma$) defined between a line (3) from a point (6) on the object (1) to the projection grid (2) and a line (4) from the object point (6) to the sensor (5).

33. The device of claim 20, comprising a first projector (8) having a grid comprising the first grid vector ($G_1$) and a second projector (9) having a grid comprising the second grid vector ($G_2$), the first and second projectors (8,9) aligned at right angles and spaced apart with respect to one another along a line extending perpendicularly to a line from the first projector (8) to a camera of the sensor (5).

34. The device of claim 20, comprising a single projector (8) and three cameras (10, 11, 12) of the sensor (5) spaced apart from one another along a line extending from the projector (8).

35. The device according to claim 20, comprising a single projector (8) arranged at an origin of an X-Y coordinate system and two cameras (13, 14) of the sensor (5), and with a first camera (13) positioned in a first quadrant of the X-Y coordinate system, closer to the X-axis than the Y-axis thereof, and outside a line extending from the projector (8) to a second camera (14).

* * * * *